US012011941B2

(12) United States Patent
Bautista et al.

(10) Patent No.: US 12,011,941 B2
(45) **Date of Patent: *Jun. 18, 2024**

(54) PRINT APPARATUS HAVING FIRST AND SECOND PRINTING DEVICES, COMPUTER READABLE MEDIUM AND COMPUTER IMPLEMENTED METHOD

(71) Applicant: HEWLETT-PACKARD DEVELOPMENT COMPANY, L.P., Spring, TX (US)

(72) Inventors: Marc Bautista, Sant Cugat del Valles (ES); Oriol Moliner, Sant Cugat del Valles (ES); Josep M. Aymerich, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/394,192

(22) Filed: Aug. 4, 2021

(65) Prior Publication Data

US 2021/0362513 A1 Nov. 25, 2021

Related U.S. Application Data

(63) Continuation of application No. 15/546,116, filed as application No. PCT/EP2015/058334 on Apr. 16, 2015, now Pat. No. 11,110,723.

(51) Int. Cl.
*B41J 3/60* (2006.01)
*B41J 3/54* (2006.01)

(52) U.S. Cl.
CPC .. *B41J 3/60* (2013.01); *B41J 3/54* (2013.01)

(58) Field of Classification Search
CPC ..................................... B41J 3/60; B41J 3/54
See application file for complete search history.

(56) References Cited

U.S. PATENT DOCUMENTS

| | | | |
|---|---|---|---|
| 5,452,959 | A | 9/1995 | Oka |
| 6,267,518 | B1 | 7/2001 | Abe |
| 6,341,860 | B1 | 1/2002 | Harris |
| 6,382,850 | B1 | 5/2002 | Freund |
| 8,211,826 | B2 | 7/2012 | Keeton |
| 8,276,808 | B2 | 10/2012 | Goodwin |
| 8,944,706 | B2 | 2/2015 | Sakamoto |
| 2002/0191998 | A1 | 12/2002 | Cremon |

(Continued)

FOREIGN PATENT DOCUMENTS

| | | |
|---|---|---|
| DE | 19929272 | 12/2000 |
| JP | S-61137762 | 6/1986 |

OTHER PUBLICATIONS

"New Parallel Printer Architecture Delivers Two Printers In One", Oct. 13, 2006, http://www.xerox.com/innovation/news-stories/parallel-printers/ennus.html.

*Primary Examiner* — David H Banh
(74) *Attorney, Agent, or Firm* — Jordan IP Law, LLC

(57) ABSTRACT

A print apparatus includes a first printing device arranged to print a first image on a first side of a print target; and a second printing device arranged to print a second image on a second side of the print target, wherein the printing capability of the print apparatus on the first side of the print target is different to the printing capability of the print apparatus on the second side of the print target.

20 Claims, 5 Drawing Sheets

(56) References Cited

U.S. PATENT DOCUMENTS

2007/0005611 A1* 1/2007 Takasugi ................ G06Q 10/06
2007/0136121 A1* 6/2007 Katsurabayashi ..... G06Q 10/06
705/7.26
2009/0015647 A1 1/2009 Rawlings
2009/0058892 A1 3/2009 Vandenmark
2009/0293750 A1 12/2009 Haenni
2011/0211893 A1 9/2011 Shishido
2011/0243637 A1 10/2011 Nakamura
2012/0027490 A1 2/2012 Hara
2012/0127501 A1 5/2012 Kobayashi
2014/0034214 A1* 2/2014 Boyer .................... B33Y 50/02
156/73.2
2014/0035987 A1 2/2014 Shimura
2014/0080605 A1* 3/2014 Peddi ...................... A63F 13/00
348/46
2014/0085368 A1 3/2014 Mo
2014/0117585 A1* 5/2014 Douglas .................. B29C 64/40
264/401
2014/0143727 A1* 5/2014 Krikke ................ G06F 3/04842
715/835
2014/0267475 A1 9/2014 Tanabe
2015/0096266 A1* 4/2015 Divine ............... G05B 19/4099
53/558
2015/0145158 A1* 5/2015 Levine .................. B29C 64/112
264/308
2015/0183214 A1 7/2015 Yasuzaki
2015/0284202 A1 10/2015 Asano
2016/0031246 A1 2/2016 Sreekumar
2017/0253354 A1* 9/2017 Colson .................. B65B 61/007

* cited by examiner

PRINT APPARATUS HAVING FIRST AND SECOND PRINTING DEVICES, COMPUTER READABLE MEDIUM AND COMPUTER IMPLEMENTED METHOD

BACKGROUND

In fields such as industrial printing, personalised printing is becoming common. For example, each customer may have unique content. A workflow may be implemented to manage aspects such as performing printing and shipping to a customer.

BRIEF DESCRIPTION OF THE DRAWINGS

Example arrangements are further described hereinafter with reference to the accompanying drawings, in which.

DETAILED DESCRIPTION

Printing workflows are evolving towards more automated print management systems, and as such having good control of workflows is becoming a consideration. A unique identification (ID) code for each print job may enable improved control of the workflow.

Figure 1:
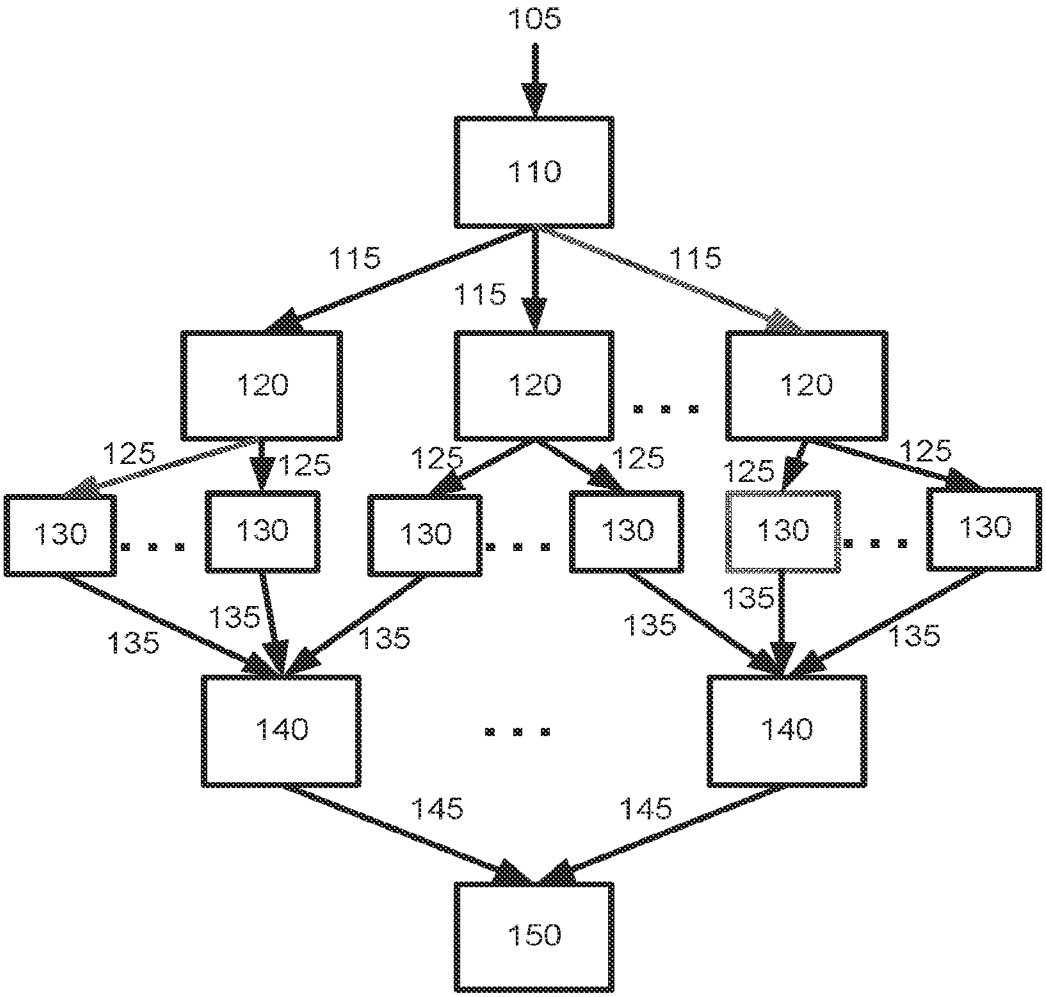
FIG. 1 is a diagram depicting an example of an industrial printing workflow.

FIG. 1 shows an example of a printing system 100. Such a system 100 may be used in an industrial printing environment, an enterprise printing environment, or other printing environment. According to the system 100 of FIG. 1, jobs 105 to be printed are centralized into a Management Integrated System (MIS) 110. The MIS 110 is responsible for analysing the content (e.g. job size, substrate to be printed, etc.) as well as printing equipment 130 (e.g. statuses, job balancing, etc.) and determines where to send the job 105 for processing. The MIS 110 then generates instruction data 115 describing the print job to a Raster Imaging Processor (RIP) 120, based on the determination of where to send the job 105. That is, the instruction data 115 describing one or more jobs 105 may be sent to a RIP 120 corresponding to a printer 130 that is selected by the MIS 110 to print the job 105 or jobs.

The selected RIP 120 processes the instruction data 115 and generates a printable image 125 based on the received instruction data 115. The printable images 125 are then sent to the selected printer 130, in accordance with the instruction data 115 and the determination by the MIS 110. The printable images 125 may be sent to the printer 130 automatically after processing by the RIP 120. On receipt of the printable image 125, the selected printer 130 prints the image onto a medium.

Once printed, the printed medium 135 may be sent to finishing equipment 140, such as a cutter for cutting the medium to its final size. The article or articles resulting from the finished print job 145 may be taken or sent by an operator for shipping (e.g. by transfer to a shipping department 150). This may be performed manually by the operator.

A job identifier may be used in workflows such as that illustrated in FIG. 1. The job identifier may describe how the printed medium should be cut and/or finished, where the final job should be shipped, etc. The job identifier may be physically associated (e.g. attached or applied to) the printed medium. This reduces the risk of incorrect handling of the printed medium, such as incorrect finishing being applied to the medium or shipping the finished article to the wrong address.

One method for providing a job identifier on the printed medium is to manually apply a sticker to the printed medium 135, prior to a finishing stage of the process. The sticker may have a representation of the job identifier on it. For example the sticker may have a barcode printed on it. Manually applying the sticker may lead to increased cost (e.g. due to additional manpower) and may increase the time to complete the print job 105. In addition, there is an opportunity for the operator to incorrectly apply the sticker (e.g. by attaching it to the wrong print job 105).

An alternative method for providing a job identifier on the printed medium is to include information relating to the job identifier (such as a barcode) in the image data. The job identifier may be placed outside of the print region of the print job, in order to avoid the job identifier affecting the final printed article. For example, the MIS 110 may add the barcode when processing the received job, such that the barcode appears close to the corresponding image but outside the boundary of the image. Where the job identifier is placed inside a boundary of the image, it may obscure or interfere with the image, and this may be unacceptable in many cases.

The job may include trimming the medium to the boundary of the image during a cutting stage. Where the job identifier is placed outside the boundary of the image, it will be separated from the image at the cutting stage, such that subsequent processing stages, such as further finishing stages and distribution would then be performed without using the job identifier. This increases the likelihood of error in stages following the cutting stage. In addition, providing the job identifier outside the region of the image may result in an increase in wasted medium (i.e. medium that is not used in the final printed article). This may become significant in some applications where the medium may be the main cost.

Figure 2:
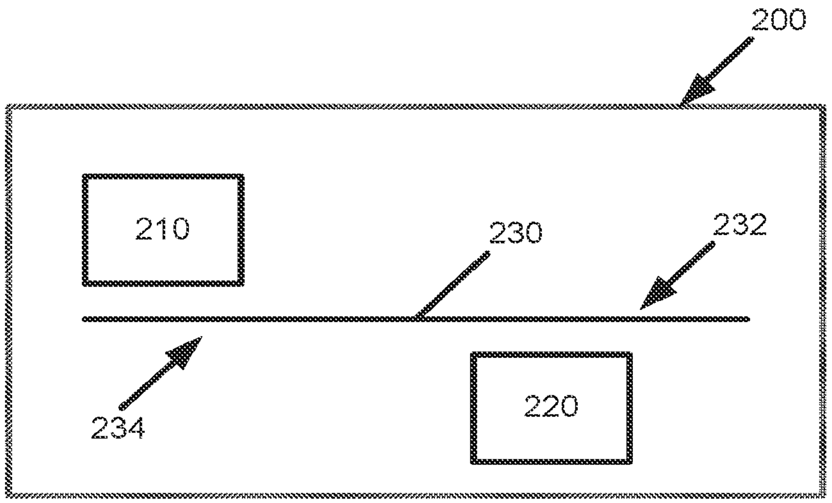
FIG. 2 is a diagram depicting an example of a print apparatus.

FIG. 2 depicts an example of a print apparatus 200. The print apparatus 200 comprises a first printing device 210 arranged to print an image on a first side 232 of a substrate or medium 230. A second printing device 220 is arranged to print a second image on a second side 234 of the medium 230. The print apparatus' 200 printing capability on the first side 232 of the medium 230 is different to the print apparatus' 200 printing capability on the second side 234 of the medium 230. Herein, references to printing capability may refer to intrinsic printing capability, which describes the capability or operating limits of the print device itself, independent of software-imposed options/limitations or limitations due to malfunction or exhausted consumables.

The printing capability may describe the print quality at which the printing devices 210, 220 may print; the print speed of the printing devices 210, 220; the size of the printable area that may be printed by the printing devices 210, 220; the number of colours printable; etc.

The print quality may be measured in terms of dots-per-inch, tones per dot location, ink (or more generally printing fluid) durability, color gamut, etc.

The print speed may be defined in terms of printable area per unit time. This may be based on the time taken to print an area of a predetermined size.

The size of the printable area may describe the maximum extent of an image on a sheet of medium. Where the medium is continuous, the size of the printable medium may be measured as a length of the maximum printable area perpendicular to a transport direction of the medium.

The number of colours may be defined as the number of different colours that the printing device handles.

Figure 3:
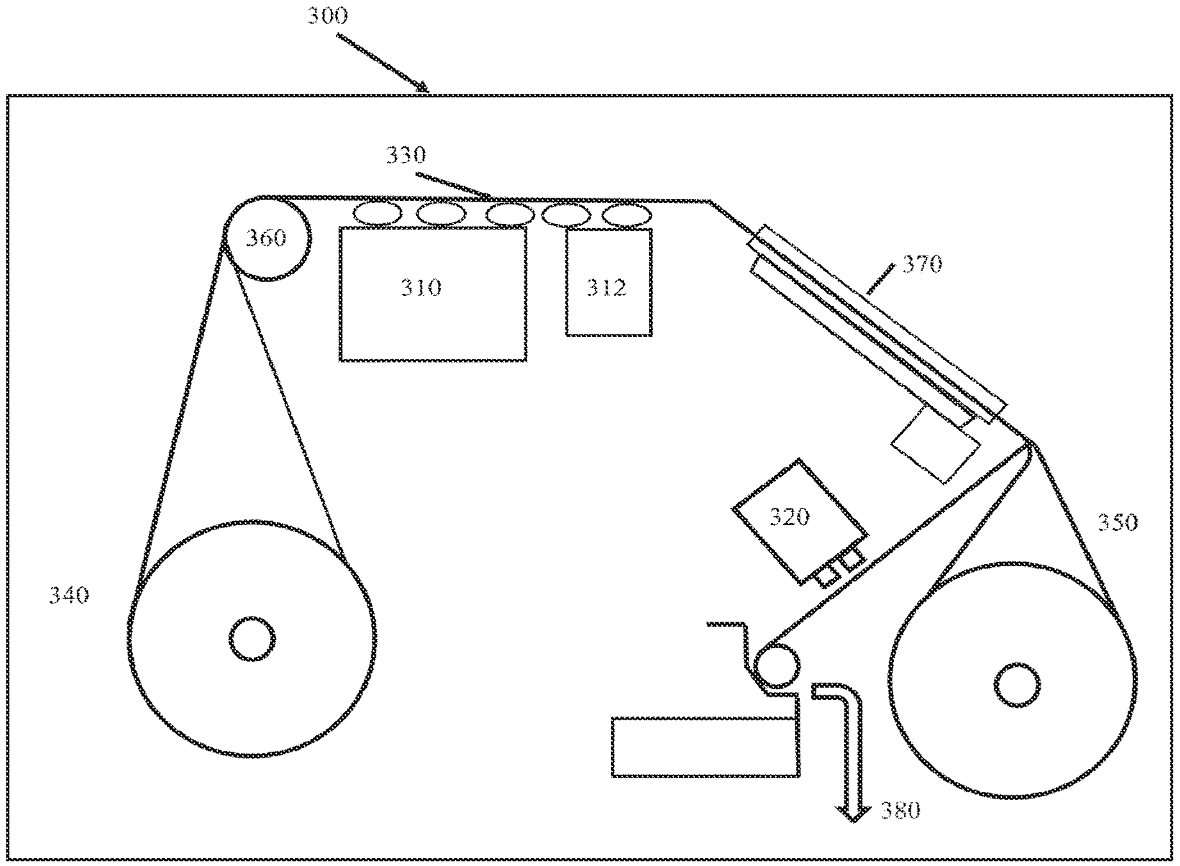
FIG. 3 is a diagram depicting an example of a print apparatus.

FIG. 3 depicts an example of a print apparatus 300. The print apparatus 300 may be a wide or super wide format printer, for example a Hewlett Packard Latex printer. The print apparatus 300 may comprise a first printing device 310 arranged to print on the first side of the substrate 330. The first printing device 310 may be a wide or super wide format printing section. The print apparatus 300 includes a second printing device 320, the second printing device is arranged to print on the second side of the substrate 330.

The print apparatus 300 may include a media input 340 and a media output 350. A media transport may be provided to transport the media 330 along a media path from the media input 340 to the media output 350 via the first 310 and second 320 printing devices. The media transport may include elements such as belts, media grippers, etc. The media transport may also include a media drive (illustrated schematically as 360) for causing the media to move along the media path. The media drive may include one or more electric motors. Elements such as a top diverter and media guide may also be provided. The wide or super wide format printing section 310 may include an ink (or printing fluid) drying area 312. In some examples, the ink drying area 312 may be located in parallel with a print engine (e.g. printheads) of the printing device 310. In some examples, a curing area 370 may be provided. In some examples, the print apparatus 300 may be arranged to print in a media to floor configuration 380. In such a configuration the position of the printed medium does not change with changing roll size. According to this arrangement, a constant distance may be maintained between the media 330 and the printing engine (e.g. printhead) of the second printing device 320.

The order of elements along the media path is not particularly limited. For example, the second printing device 320 may be provided between the media input 340 and the first printing device 310.

The printing capability of the second printing device is different to the printing capability of the first printing device.

According to some examples, the first printing device 210, 310 produces a first image on the first side 232 of the medium 230, 330 in accordance with a received print job. The first image may be a high quality image. The second printing device 220, 320 may produce a second image on the second side 234 of the medium 230, 330. The second image may be a lower quality image than the first image. The second image may describe or represent workflow management data. The second image may represent a job identifier. In some examples the job identifier is a 1-D barcode, a 2-D barcode or a matrix barcode, a QR code, a company logo, etc. The job identifier may provide information for tracking the print job/printed medium. The job identifier may relate to a database, for example by identifying a particular record that describes the print job associated with the first image. In some examples the job identifier may directly encode information about the print job.

The second image may be within an area defined by the first image (although on the opposite side of the medium 230, 330. In some examples the identification code (second image) may be between 0.25 cm and 5.1 cm along each side.

The second printing device 220, 320 may be simpler or less expensive than the first printing device 210, 310, since the target properties of a second image may be different from the target properties for the first image. For example, the second image may have a lower image quality, may be monochromatic, and/or may be less resilient (e.g. to weather, sunlight, etc.), for example.

The first printing device 210, 310 may be any suitable printing device. For example, the first printing device 210, 310 may be a latex printer, an ink jet printer, etc. The first printing device may have one or more moveable printheads, or may have a page wide array configuration, such as an array of printheads or nozzles.

The second printing device 220, 230 may be an ink jet printer. Other printing technologies may alternatively be used, such as laser printing, dot-matrix printing, etc.

The second printing device 220, 230 may have one or more printheads on a moveable carriage. The carriage may be moveable in a scanning direction, i.e. perpendicular to a medium transport direction and parallel to a surface of the medium. A beam may be provided along the scan direction and the carriage may be mounted on and moveable along the beam. A servo motor may be provided to move the carriage along the beam.

In some examples the second printing device 220, 230 includes up to four printheads. Each printhead of the second printing device 220, 320 may have its own capping and servicing system to maintain good printing quality.

The second printing device 220, 320 may be in data communication with the first printing device 210, 310. The data communication may be one way (e.g. with the second printing device 220, 320 receiving but not sending data). In some examples the first 210, 310 and second 220, 320 printing devices are in communication with a processing section external to both devices (although possibly within the print apparatus 200, 300). In some examples, the communication with the second printing device 220, 320 may be via a gigabit Ethernet connection with the main interface of the first printing device. The second printing device 220, 230 may be provided with an electrical cabinet containing the appropriate power supply or supplies and a programmable logic controller to control the moving elements.

Figure 4:
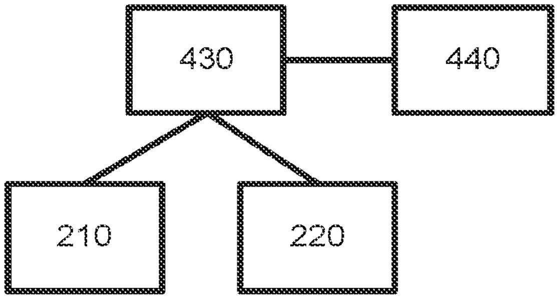
FIG. 4 is a diagram depicting an example of a print apparatus.

FIG. 4 illustrates an arrangement suitable for use with the print apparatus of FIGS. 2 and 3. FIG. 4 includes memory 440 for storing data and/or software instructions. Memory 440 may include one or more of an Application Specific Integrated Circuit (ASIC), Random Access Memory (RAM), Read Only Memory (ROM), a mass storage device, such as a hard disk, etc.

The memory is in data communication with controller 430. Controller 430 is arranged to control the first 210, 310 and second 220, 320 printing devices. Controller 430 may include one or more processors for executing software instructions.

The first 210, 310 and second 220, 320 printing devices are controlled by the controller 430 to produce the first and second images, as described. The controller 430 may send, to the second printing device 220, 320, information describing the second image and the location of the second image. The information may include respective codes to be printed by the one or more printheads of the second printing device 220, 320 along with information to control the movement of the carriage of the second printing device 220, 320.

The first 210, 310 and second 220, 320 printing devices may be arranged to operate at the same time. According to some examples, the second printing device 220, 320 may be synchronized to the first printing device 210, 310. A synchronization signal may be provided to the second printing device 220, 320, e.g. from the first printing device 210, 310 or the controller 430.

In some examples the second image is within a boundary defined by the first image, albeit on a reverse side of the medium. Thus, the second image may be behind the first image, such that after cutting to the boundary of the first image, the second image remains on the same piece of medium as the first image.

Figure 5A:
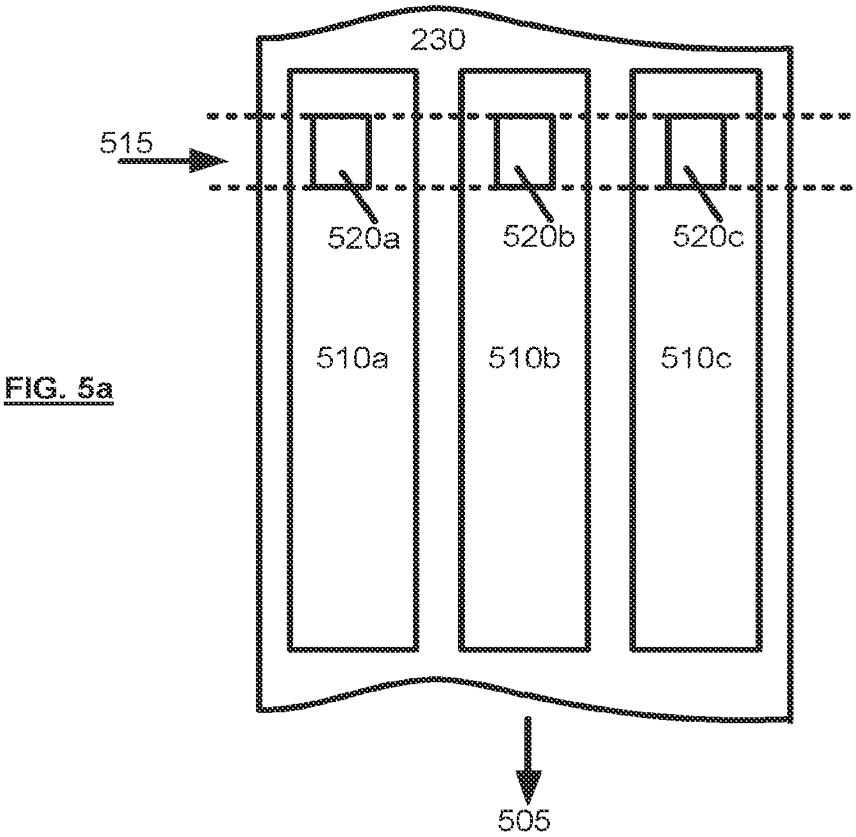
FIG. 5*a* is a diagram depicting an example of a printed medium illustrating printing on both sides of a printed medium.
Figure 5B:
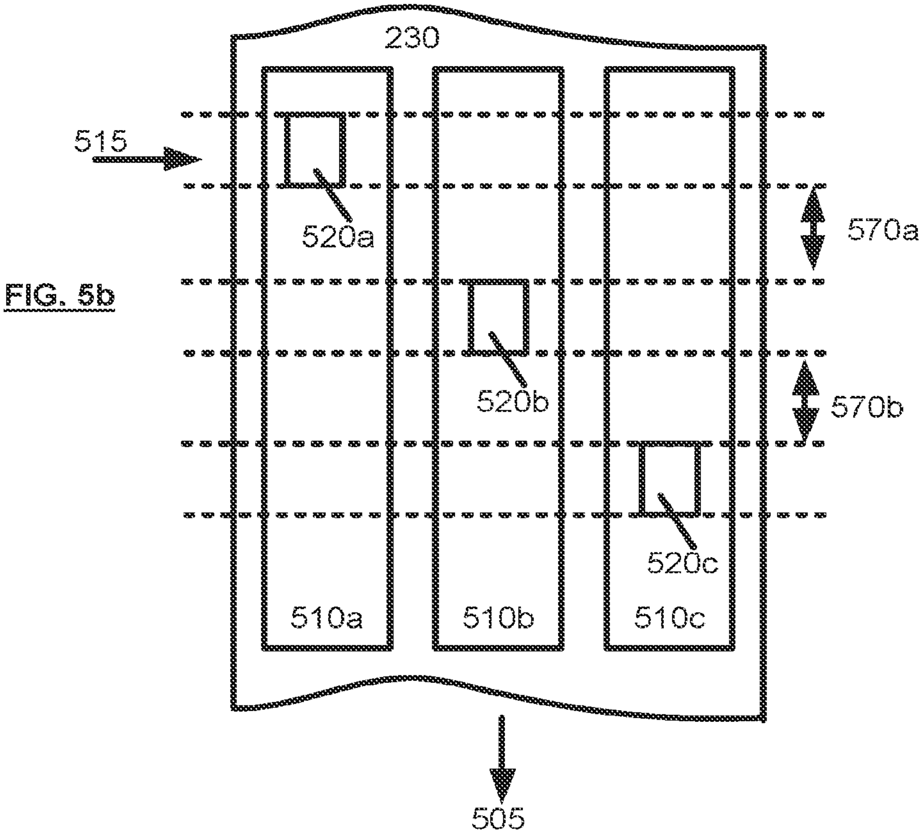
FIG. 5*b* is a diagram depicting another example of illustrating printing on both sides of a printed medium.

In some arrangements, the positioning of the second image may be determined by taking into account relative printing speeds of the first 210, 310 and second 220, 320 printers. For example, FIG. 5*a* illustrates an example where a plurality of first images 510*a-c* are arranged next to each other along a scan direction 515 of the medium 230. A translation direction of the medium is illustrated by arrow 505. If respective second images 520*a-c* are to be applied to a reverse side of each of the first images 510*a-c* on the same line along the scan direction 515, the second printing device 220, 320 might not be sufficiently quick to print all of the second images 520*a-c* without slowing the speed of the medium 230 through the print apparatus 200, 300. According to some examples, MIS 110 or controller 430 may determine the position of one or more of the second images 520*a-c* based at least in part on a consideration of the relative printing speeds of the first 210, 310 and second 310, 320 printing devices. For example, the positions of the second images 520*a-c* may be selected or modified as in FIG. 5*b*. In some examples, the controller 430 may avoid more than one (or some other predetermined number) of second images 520*a-c* being on the same line in a scan direction. In some examples, the controller 430 may ensure that there is a minimum spacing 570*a-b* along the medium transport direction between each of the second images 520*a-c*, the minimum spacing being selected to allow the moveable carriage time to move, in the scan direction, between the respective positions of the second images. The minimum spacing 570*a-b* may be determined based on a spacing of the second images in the scan direction.

According to some examples, the medium is stationary (i.e. does not move relative to the second printing device) when the second printing device is printing onto the medium. In some examples the medium is also stationary (i.e. does not move relative to the first printing device) when the first printing device is printing onto the medium. In some examples, both printing devices can print at the same time while the medium is not moving.

Figure 6:
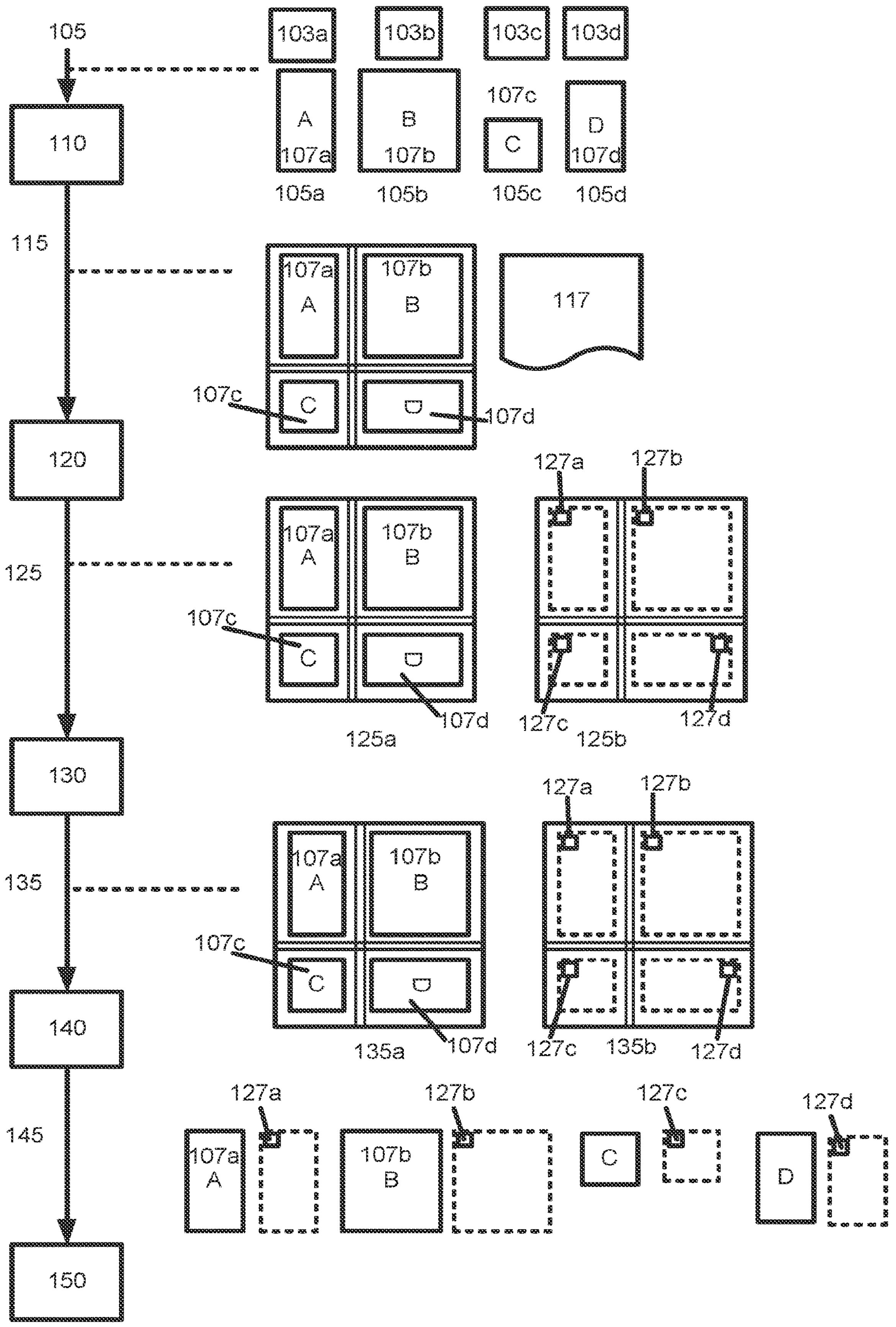
FIG. 6 is a diagram depicting an example of a workflow for printing.

FIG. 6 depicts an example of a workflow. MIS 110 receives print jobs 105, respectively including images 107*a-d*. Each of these images corresponds with a first image in the description above. The MIS 110 processes the print jobs 105 into instruction data 115. The processing includes generating second image instructions 117 for producing second images 127*a-d* respectively corresponding with the first images 107*a-d*. The instruction data includes the first images 107*a-d* and the second image instructions 117. Each second image 127*a-d* may be a code containing information associated with the respective print job 105 or information associated with the corresponding first image 107*a-d*, or both. In some cases the second image may 127*a-d* be text, such as a job name, in some cases the second image may be a code, such as a barcode. The instruction data 115 may also describe the positions of the first and second images. The instruction data 115 may be arranged to cause the first images 107*a-d* to be printed on the first side 232 of the substrate 230, and the second images 127*a-d* to be printed on the second side 234 of the substrate 230. In some examples, the positions of the first images 107*a-d* may be determined in order to minimise, reduce or avoid unnecessary waste of media. That is, to avoid unused media. In some arrangements a minimum spacing may be provided between the first images to allow for positional tolerance, e.g. when the images are cut subsequently. In some examples one or more of the first images 107*a-d* may be rotated in order to better fit the medium (e.g. to use the medium in an efficient manner.)

In some examples the second image instructions 117 may be a text file. In some examples the second image instructions 117 include, for each first image 107*a-d*, information describing a QR code, with the QR code being the second image 127*a-d*. Each QR code may be defined in the second image instructions by an identification of the content of the QR code and a position of the QR code. The content of the QR code may be an identifier for an image file, text to be printed, or data to be encoded (e.g. in a matrix barcode).

The instruction data 115 may be the result of nesting together the received print jobs 105. The instruction data 115 may be generated based on a calculated printing time or a calculated wastage of medium. For example, the print jobs may be nested in the instruction data in a manner that optimises printing time or minimises media waste.

In some examples each of the print jobs 105 may be provided in a separate file. The print jobs 105 may each include information 103*a-d* such as a media on which the image or images are to be printed, a name and address for shipping of the finished article, etc. In addition, the information 103*a-d* may include details of finishing to be performed on the job or image, following printing of the image.

The print jobs may represent jobs from different sources (e.g. different customers), different shipping addresses and/or different processing options to be applied, such as medium or finishing options.

FIG. 6 has been described as four print jobs 105 each including a single image. However, in some examples, FIG. 6 may represent a single print job having four images, or two print jobs each having two images, etc. Further, instruction data 115 has been described as including a plurality of first images. However, in some arrangements, the instruction data may have a format representing images 107*a-d* as a single composite image or nested image.

The instruction data 115 is provided to RIP 120. The RIP rasterizes the images and sends the rasterized images (e.g. printable image 125) to print apparatus 130, such as the print apparatus illustrated in FIG. 2 or FIG. 3. The rasterized image may be provided to a main interface of a wide or super wide format printer, for example.

FIG. 6 illustrates the rasterized images 125 with 125*a* representing the images 107*a-d* to be printed on the first side 232 of the medium 230, and 125*b* representing the images 127*a-d* to be printed on the second side 234 of the medium 230. For illustrative purposes, to simplify comparison of 125*a* and 125*b*, the images 127*a-d* to be printed on the second side 234 of the medium are shown as if viewed from the first side 232 of the medium 230, that is viewed "through" the medium.

The print apparatus 130 receives the rasterized images 125 and prints the nested images, i.e. the first images 107*a-d*, using the first printing device 210. The second images

127*a-d* (e.g. QR codes) are printed by the second printer 220. The positions of the second images 127*a-d* are as determined by MIS 110.

A synchronization signal may be sent from first printing device 210 or controller 430 to the second printing device 220 in order to synchronise the printing on the first 232 and second 234 sides of the medium 230, to ensure that the relative positions of the first 107*a-d* and second 127*a-d* images are in accordance with the instruction data 115 produced by the MIS 110. The synchronization signal may be sent to the second printing device 220 when the first printing device 210 starts printing the first image.

In some examples the second printing device 220 may send the synchronization signal to the first printing device 210 or the controller 430. In some arrangements with the second printing device 220 positioned before the first printing 210 device along a medium path, the second printing device 220 may send a synchronization signal when it starts printing, for example.

When the printing has finished, the printed medium 135 may be sent for cutting and finishing. The printed medium 135 has the first images 107*a-d* of the original print job on a first side 232 and the second images 127*a-d* determined by the MIS 110 on the second side 234.

In the workflow of FIG. 6, the printed medium 135 is then cut by cutter 140 to produce individual completed print jobs 145. These may then be passed to a shipping department for distribution. As the second image is on the reverse side of the first image of the completed print job, it remains with the completed print job after the cutting process, and so it is possible to use the second image as a tracking code for use in shipping, for example. Moreover, the second image is applied without any manual intervention, and so the application of the second image (e.g. tracking code, QR code) may be reliable and accurate. This is particularly beneficial when there are many different jobs, for example where each job is different, or when efficient use of resources can be obtained by mixing print jobs. In such cases, the traceability of the printed job is improved without a significant increase in manual intervention. This may allow print jobs to be combined in a reliable way that is efficient, e.g. in terms of medium usage or print time, without significant increase in errors, such as jobs being mixed-up.

For simplicity, FIG. 6 illustrates a single RIP, a single printer and a single cutter, but in some examples more than one of each of these elements may be used, as illustrated in FIG. 1, for example.

The second image may be a code, such as a QR code. The code may be used, for example, to represent a final destination (e.g. delivery address) of a print job; a code for internal tracking and quality control (e.g. identifying the printer, operator, shift, etc.) In some examples the second image may be a company logo or other watermark. In some examples, the second image may include coordinates or reconstruction instructions for multi-job final printing, such as for car wrapping. The second image may also be used as invisible marking, for example using ink (or printing fluid) visible under UV light.

According to some examples, the above system may be automated, removing or reducing the opportunity for human error. No physical intervention by an operator is needed in some arrangements, leading to reduced operation time and improved efficiency, since tracking information may be reliably provided with the finished article resulting from the finished job.

Figure 7:
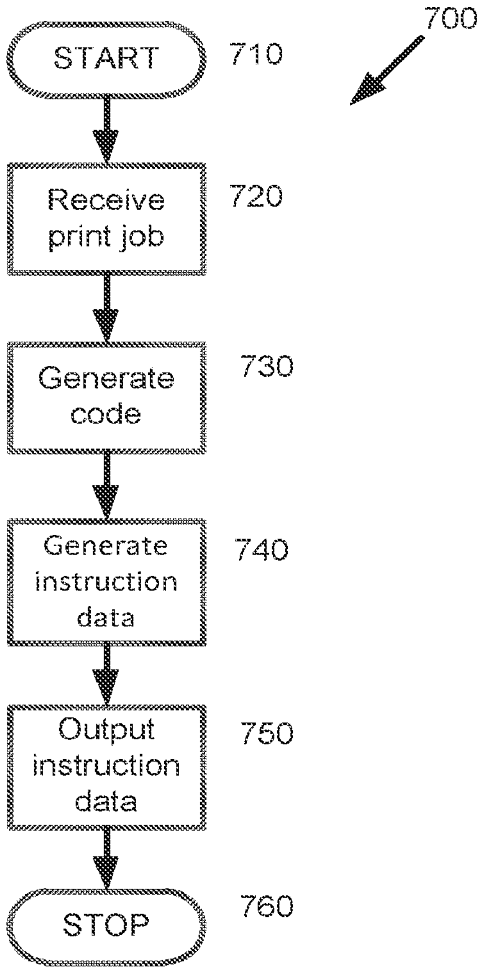
FIG. 7 is a diagram illustrating a printing method.

FIG. 7 illustrates a method 700 according to some examples. The method begins at 710, and a print job 105 is received, e.g. by a MIS 110, at 720. At 730 a code is generated that contains information associated with the print job 105. Instruction data 115 is generated at 740. The instruction data 115 includes instructions to cause the image to be printed on a first side 232 of a medium 230 and the code to be printed on a second side 234 of the medium 230.

The instruction data is output at 750. In some examples the instruction data is output to a RIP 120. In some examples, the instruction data may be output directly to a printer. In yet further examples, the instruction data may be output to a storage medium for later use.

The method ends at 760.

The method may be implanted by a computer or on one or more processors. In some examples, the method may be implemented by a computer operating as a MIS 110. Instructions to cause a processing device to perform the method may be stored on computer-readable media, such as an optical disk, volatile or non-volatile memory, ROM, a mass storage device, etc. In some cases, the media may be a non-transitory computer-readable medium.

References herein to media for printing include any suitable substrate for printing, such as paper, banners, textiles, polyester, etc.

The example work flows made use of a MIS 110 and RIP 120. In some examples the functions of these elements may be performed by a single use or multiple units. In some examples some or all of the functions of the MIS 110 and RIP 120 may be performed by the print apparatus.

Examples herein refer to a medium, but more generally, the printing could be applied to a print target.

The examples herein have been given in relation to 2D printing. However, some examples may be applied to 3D printing arrangements, where the print target is a bed of build material. For example, the first printing device may be a 3D printer and the second device may be a 2D printer. In some examples the second device may be a 3D printer.

References to finished or final article do not preclude further processing of the article. Rather these terms refer to an article that has been printed and to which the relevant finishing stages have been applied.

According to some examples, a wide format (also known as large format) printer may be any printer (e.g. a computer-controlled printing machine) that supports a maximum print roll width or medium width of between 18" (45 cm) and 100" (254 cm). Printers with capacities over 100" (254 cm) wide may be referred to as super wide or grand format printers.

Throughout the description and claims of this specification, the words “comprise” and “contain” and variations of them mean “including but not limited to”, and they are not intended to (and do not) exclude other moieties, additives, components, integers or operations. Throughout the description and claims of this specification, the singular encompasses the plural unless the context dictates otherwise. In particular, where the indefinite article is used, the specification is to be understood as contemplating plurality as well as singularity, unless the context dictates otherwise.

Features, integers and characteristics described in conjunction with a particular aspect or example are to be understood to be applicable to any other aspect or example described herein unless incompatible therewith. All of the features disclosed in this specification (including any accompanying claims, abstract and drawings), and/or all of the elements of any method or process so disclosed, may be combined in any combination, except combinations where at least some of such features and/or operations are mutually exclusive. The details of any foregoing examples are not restrictive.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A non-transitory computer-readable medium comprising instructions to cause a printer to:

receive a print job, the print job comprising both image data defining an image to be printed and additional information associated with the print job;

analyze the additional information of the print job to produce a code that represents the additional information associated with the print job in an encoded form;

print a first image at a first quality on an unfinished print target; and print a second image at a second quality on the print target, the second image comprising a printed version of the code generated to represent the additional information associated with the print job, wherein the second quality is lower than the first quality and wherein the additional information includes a job identifier that is represented by the code and printed to finish the unfinished print target, wherein the job identifier includes workflow management data that describes the print job.

2. The non-transitory computer-readable medium of claim 1, wherein the printer is a three-dimensional printer, the first image being a cross section of an object being formed and the second image comprising a code representing instructions to cut the unfinished print target into sections.

3. The non-transitory computer-readable medium of claim 1, wherein the printer is a wide or super wide format printer, the instructions to format printing for the wide or super wide format printer.

4. The non-transitory computer-readable medium of claim 1, wherein a first printing device to print the first image is a wide or super wide format printing section.

5. The non-transitory computer-readable medium of claim 4, wherein a second printing device to print the second image is an inkjet printer.

6. The non-transitory computer-readable medium of claim 1, wherein the print target is a print medium and wherein the first image is printed on a front side of the print medium and the second image is printed on a back side of the print medium within a boundary defined by the first image, the second image printed at a location on the back side of the print medium that allows the second image to remain on the back side after the print medium is cut during a finishing operation.

7. The non-transitory computer-readable medium of claim 6, further comprising instructions to modify a position of the second image on the print target away from an intended position of the second image as specified in the print job, comprising modifying the position of the second image based on a difference in printing speed between a first printing device printing the first image and a second printing device printing the second image.

8. The non-transitory computer-readable medium of claim 1, wherein printer is an ink jet printer, the instructions to format printing for the ink jet printer.

9. The non-transitory computer-readable medium of claim 1, wherein the unfinished print target is a two-dimensional print medium.

10. The non-transitory computer-readable medium of claim 1, wherein the instructions cause the second image to be printed within a boundary defined by the first image, such that the second image is behind the first image.

11. A non-transitory computer-readable medium comprising instructions that, when executed, cause a printing system to:

with a first printing device arranged to print on a first side of a print target, print a first image on the print target based on a print job;

with a second printing device arranged to print on a second side of the print target, print a second image on the print target based on the print job, wherein the printing capability of the first printing device on the first side of the print target is different than the printing capability of the second printing device on the second side of the print target, each printing device having a print speed that is defined in terms of a time taken for a respective printing device to print an area of a predetermined size; and modify a position of the second image on the print target away from an intended position of the second image as specified in the print job, comprising modifying the position of the second image based on a difference in printing speed between the first printing device and the second printing device.

12. The non-transitory computer-readable medium of claim 11, further comprising instruction to analyze additional information of the print job to produce a code that represents the additional information associated with the print job in an encoded form, the second image comprising the code.

13. The non-transitory computer-readable medium of claim 12, wherein the code of the second image represents instructions for further handling of a printed product comprising the first and second images after printing.

14. The non-transitory computer-readable medium of claim 11, wherein the printing system is a wide or super wide format printer, and the first printing device is a wide or super wide format printing section.

15. The non-transitory computer-readable medium of claim 14, wherein the second printing device is an ink jet printer.

16. The non-transitory computer-readable medium of claim 11, wherein the first printing device prints at a first quality, and the second printing device prints at a second quality, the second quality being lower than the first quality.

17. The non-transitory computer-readable medium of claim 11, further comprising instructions to communicate a synchronization signal between first control circuitry and second control circuitry, the first control circuitry for controlling the first printing device and the second control circuitry for controlling the second printing device.

18. The non-transitory computer-readable medium of claim 11, further comprising instruction to:

move the print target past and between the first and second printing devices, and move a printhead of the second printing device along a scan axis, wherein the scan axis is perpendicular to a direction of movement of the print target past the printhead.

19. A print apparatus, comprising:

a first printing device, comprising a three-dimensional printer, arranged to print at a first quality on an unfinished print target to form a three-dimensional object under control of a controller and based on a print job; and a second printing device arranged to print an image at a second quality on the three-dimensional object under control of the controller and based on the print job, wherein the image comprises a job identifier that is represented by a code and printed to finish the unfinished print target, wherein the job identifier includes workflow management data that describes the print job, and wherein the second quality is lower than the first quality.

20. The print apparatus of claim 14, wherein the controller is to receive the print job and analyze data of the print job to produce the job identifier based on the data of the print job.

* * * * *